(12) United States Patent  
Wiesemann

(10) Patent No.: US 6,177,020 B1  
(45) Date of Patent: Jan. 23, 2001

(54) STEPPING SCREEN ASSEMBLY FOR COLLECTING SOLIDS IN WASTE WATER DISCHARGES

(76) Inventor: Bruce O. Wiesemann, 10388 Longwood Dr., Largo, FL (US) 33773

( * ) Notice: Under 35 U.S.C. 154(b), the term of this patent shall be extended for 0 days.

(21) Appl. No.: 09/515,739

(22) Filed: Feb. 29, 2000

(51) Int. Cl.⁷ .................................................. B01D 33/01
(52) U.S. Cl. .......................... 210/780; 210/791; 210/155; 210/159
(58) Field of Search .................................... 210/780, 791, 210/155, 159, 407, 359, 388, 389

(56) References Cited

U.S. PATENT DOCUMENTS

| 4,521,305 | 6/1985 | Deal . |
| 4,853,116 | 8/1989 | Wallander . |
| 5,618,415 | 4/1997 | Johnson, Jr. . |

*Primary Examiner*—Robert Popovics  
(74) *Attorney, Agent, or Firm*—Larson & Larson, P.A.; James E. Larson

(57) ABSTRACT

A stepping screen assembly bottom portion is located in a liquid waste stream containing solids. The assembly contains a grid structure surrounded by an outer frame. The grid structure includes multiple parallel alternate static and dynamic bars horizontally spaced apart by spacers attached to the sides of the dynamic bars. Each bar has multiple vertically spaced apart shelves at a right angle to the vertical axis of the bar. The outer frame on each side of the grid structure contains a single and double stroke pneumatic cylinder connected to the dynamic bars. The single stroke cylinder causes the dynamic bars to move in a vertical plane and the double stroke pneumatic cylinder causes the dynamic bars to move in a horizontal plane.

20 Claims, 9 Drawing Sheets

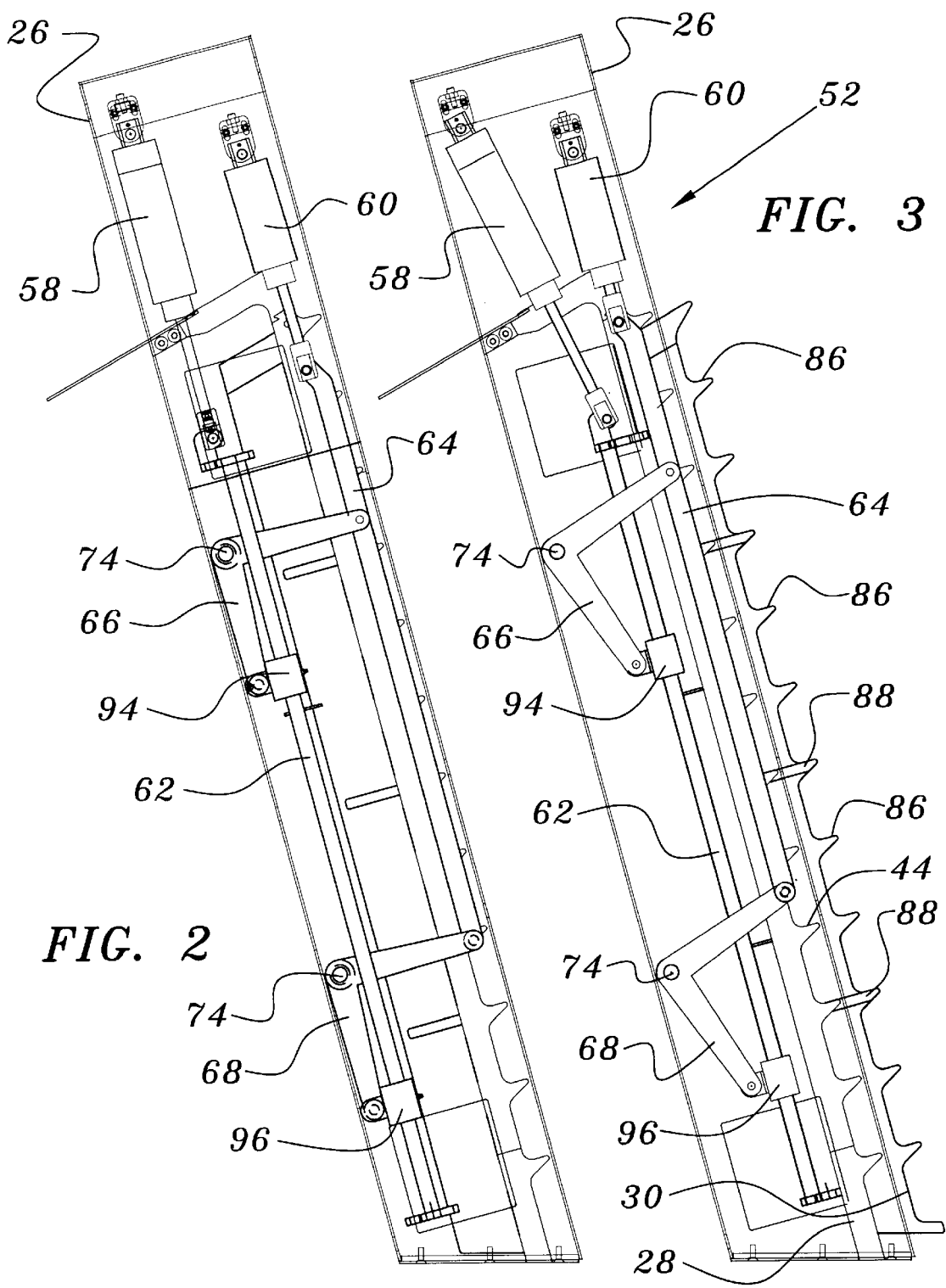

STEPPING SCREEN ASSEMBLY FOR COLLECTING SOLIDS IN WASTE WATER DISCHARGES

FIELD OF THE INVENTION

This invention relates to a screen assembly for collecting and discharging solid matter from a liquid-solid mixture in a waste stream. More particularly, it refers to a pneumatic drive assembly containing a stepping screen for lifting solids out of a waste water stream and depositing them in a solids repository.

BACKGROUND OF THE INVENTION

It is well known in the prior art as shown in U.S. Pat. No. 4,853,116 to use a driving motor with an associated gear box propelling a pair of chains to move a grid structure upwardly and thereby lift solids out a liquid-solid mixture in a waste stream. Saw teeth are formed on combinations of displaceable bars and stationary bars to prevent the displaceable bars from becoming blocked. Such a system, while accomplishing its intended purpose, is cumbersome and unusually complex resulting in a high cost assembly of components. A more efficient and cost effective system is needed.

SUMMARY OF THE INVENTION

The present invention overcomes the deficiencies of the assembly described in U.S. Pat. No. 4,853,116 and provides an efficient cost effective means of removing solids from a liquid waste stream.

The invention is directed to an assembly of a grid structure surrounded by an outer frame with the assembly bottom portion located in a liquid waste stream containing solids. The grid structure includes multiple parallel alternate static and dynamic bars. Each bar has multiple vertically spaced apart shelves at a right angle to the vertical axis of the bar. The dynamic bars have multiple spacers located on each side surface to space the dynamic bars from the static bars and support the horizontal displacement of the bars.

The outer frame on each side of the grid structure contains a single and double stroke pneumatic cylinder connected to the dynamic bars by a shaft and mounting plates. The single stroke cylinder causes the dynamic bars to move in a vertical plane and the double stroke cylinder cause the dynamic bars to move in a horizontal plane as dictated by a preprogrammed pneumatic system.

The grid structure moves solid material upwards and over the top of the grid structure to fall by gravity onto a conveyor for delivery of the solids to a waste receptacle. The liquid moves through the grid structure without impediment.

BRIEF DESCRIPTION OF THE DRAWINGS

The invention may be best understood by those having ordinary skill in the art by reference to the following detailed description when considered in conjunction with the accompanying drawings in which:

FIG. 2 is a cut-away elevational view of the assembly side frame containing the pneumatic piston driving mechanism depicting a home stage.

FIG. 3 is a cut-away elevational view according to FIG. 2 with the driving mechanism depicting movement of the dynamic bars outwardly.

DETAILED DESCRIPTION OF THE INVENTION

Throughout the following detailed description, the same reference numbers refer to the same elements in all figures.

Figure 1:
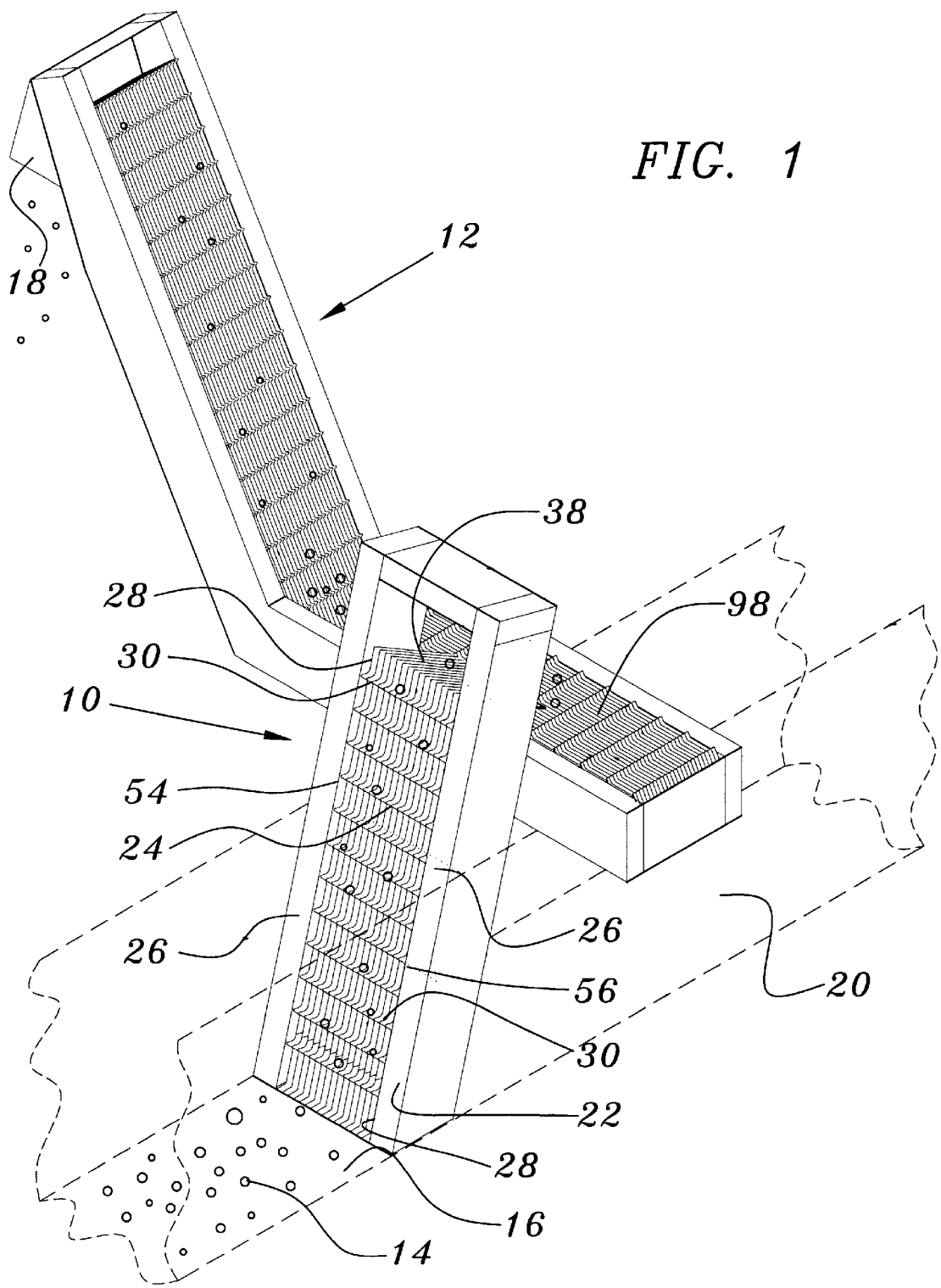
FIG. 1 is a perspective view of the stepping screen assembly of this invention together with a conveyor for carrying away solid matter.

The stepping screen assembly 10 shown in FIG. 1, together with a conveyer assembly 12 lifts solid matter 14 from a waste water stream 16 and eventually deposits the solid matter in a waste repository 18. Waste water 20 free of solid matter 14 proceeds through the stepping screen without impediment. Only the bottom portion 22 of the stepping screen assembly 10 is immersed in the waste water stream 16.

The stepping screen assembly as shown in FIG. 1 is upwardly inclined and contains a grid structure 24 surrounded by an outer frame 26. The grid structure 24 contains alternating static 28 and dynamic 30 elongated bars as shown in more detail in FIGS. 4–12.

Figure 4:
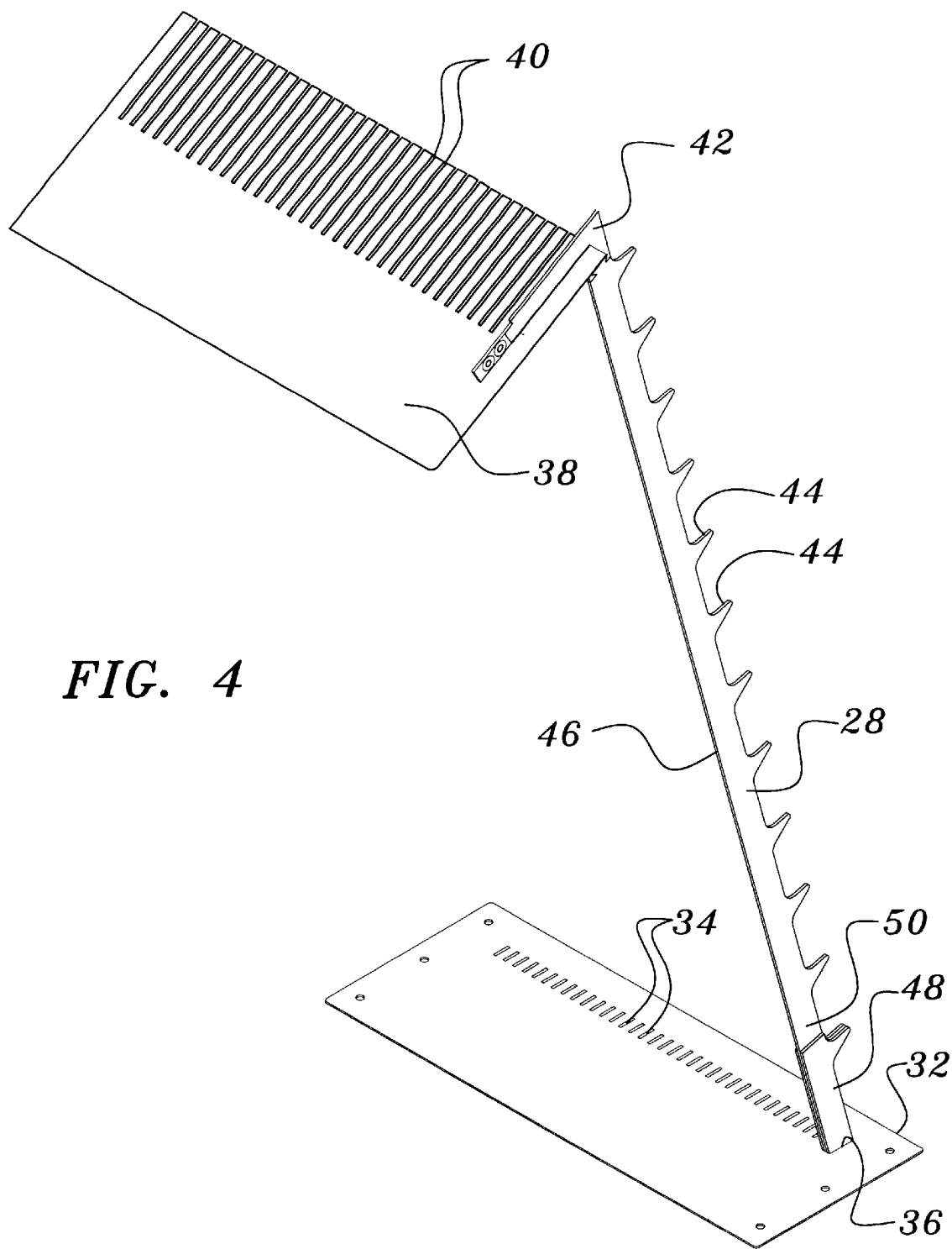
FIG. 4 is a perspective view of a side edge static bar mounted to a top disposal plate and a bottom plate.

The static bars 28 remain in a fixed position within the grid structure 24 and are mounted as shown in FIG. 4. A bottom plate 32 has slots 34 into which a bottom end 36 of static bar 28 fits. A top, downwardly inclined disposal plate 38 has grooves 40 into which an L-shaped end portion 42 of the static bar 28 fits. Multiple shelves 44 at a right angle to the vertical axis of the static bar 28 are equally spaced apart along static bar 28 facing outwardly from a rear edge 46. A spacer 48 is mounted along an outer surface 50 above the bottom end 36 of a first static bar positioned at the outermost edge of the grid structure 24 at each side adjacent the outer frame 26.

The dynamic bars 30 shown in FIGS. 2–3 and 5–6 are driven by a dual pneumatic piston assembly 52 mounted on a first side 54 and second side 56 of the grid structure 24 within the outer frame 26. The pneumatic piston assembly 52, as shown in FIGS. 2–3, has a single stroke pneumatic cylinder 58 and a double stroke pneumatic cylinder 60.

Figure 6:
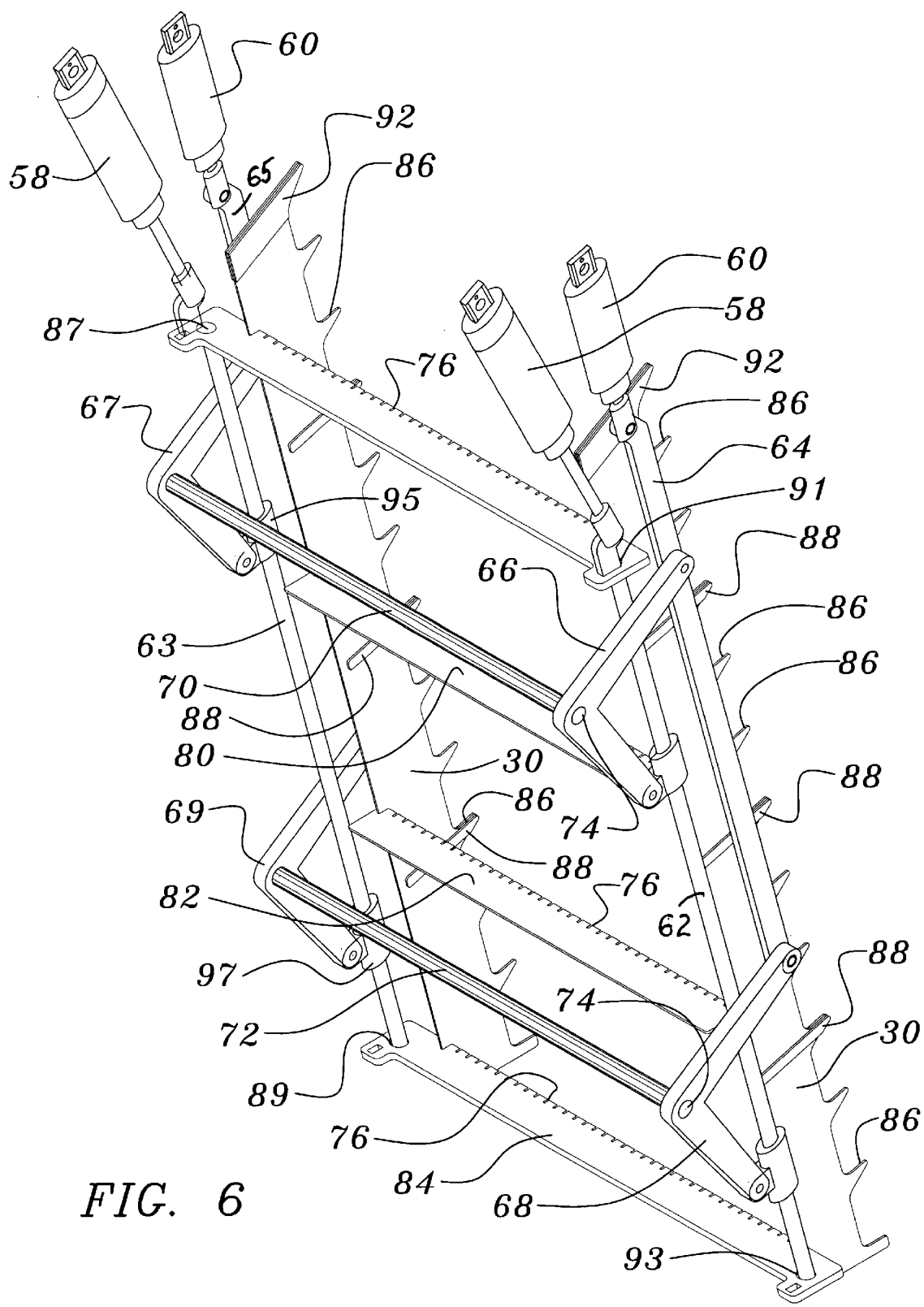
FIG. 6 is a perspective view of the pneumatic driving mechanism connected to multiple dynamic bars.

Referring to FIGS. 2–3 and 6, the single stroke pneumatic cylinders 58 drive shafts 62 and 63 downwardly and upwardly to move the dynamic bars 30 downwardly and upwardly. The double stroke pneumatic cylinders 60 drive bars 64 and 65 which move bell cranks 66, 68 and 67 and 69, respectively. Cylinders 60 therefore, drive the dynamic bars 30 outwardly and inwardly. Torsion bars 70 and 72 are joined at each end to the pivot point 74 on each bell crank 66, 67 and 68 and 69, respectively. All the dynamic bars 30 are mounted within grooves 76 in transverse mounting plates 78, 80, 82 and 84. Bores 87 and 89 in mounting plates 78 and 84 respectively, receive the ends of shaft 63 and bores 91 and 93 in mounting plates 78 and 84 respectively, receive the ends of shaft 62. Therefore, as cylinders 58 move shafts 62 and 63 downwardly, all dynamic bars 30 move downwardly at one time. Likewise, when shafts 62 and 63 are moved upwardly by an upward stroke of cylinders 58, all dynamic bars 30 move upwardly at one time. When the cylinders 60 stroke moves downwardly, the bell cranks 66, 67, 68 and 69 cause the mounting plates 78, 80, 82 and 84 to move outwardly. Thus, all the dynamic bars 30 move outwardly. Likewise, when the stroke of cylinder 60 moves upwardly, the bell cranks 66, 67, 68 and 69 cause the mounting plates 78, 80, 82 and 84 to move inwardly.

Figure 5:
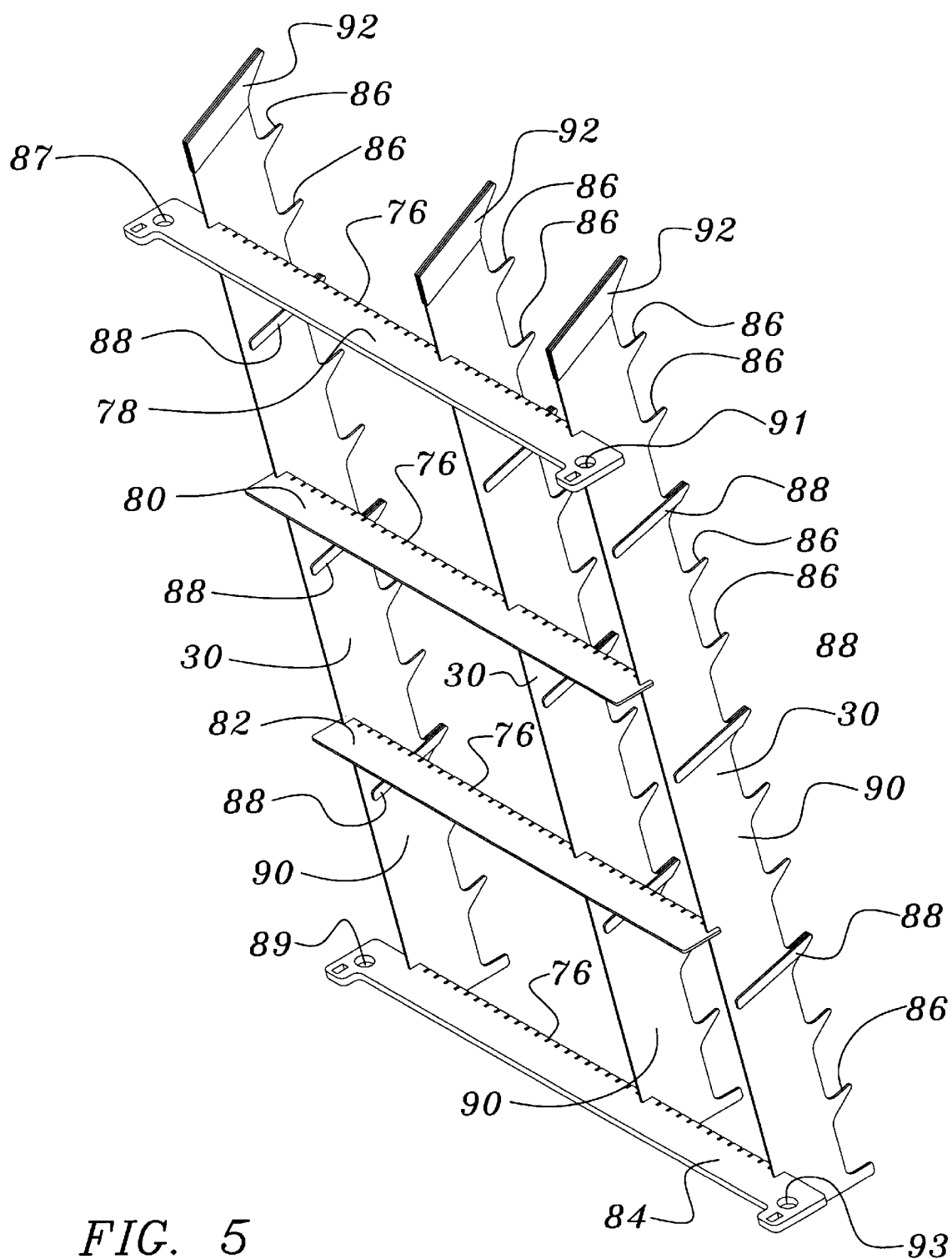
FIG. 5 is a perspective view of multiple dynamic bars connected together.

Each dynamic bar 30 has multiple outwardly directed shelves 86 at a right angle to the vertical axis of each bar 30 and are used to lift solid matter 14 upwardly along the grid structure 24. Each shelf 86 is equally spaced apart from the next adjacent shelf Multiple spacers 88 are positioned on each side surface 90 of each dynamic bar 30 to maintain a proper relationship to the static bars 28 and act as a strengthening element for the bars 28 and 30. A larger size top spacer 92 is located at a top side surface of the dynamic bars 30 as seen in FIGS. 5–6. The diameter of each spacer 88 is 2 ml to 9 ml to determine the openings in the grid structure 24. The spacers 88 also act to push solid material off static bars 28 in the movement shown in FIG. 9.

As seen in FIG. 2, movement of the bell cranks 66 and 68 cause movement of shaft 62 through fixed connector sleeves 94 and 96, respectively. Corresponding fixed connector sleeves 95 and 97 as seen in FIG. 6, are mounted on shaft 63 to connect to bell cranks 67 and 69, respectively.

Figures 7, 8:
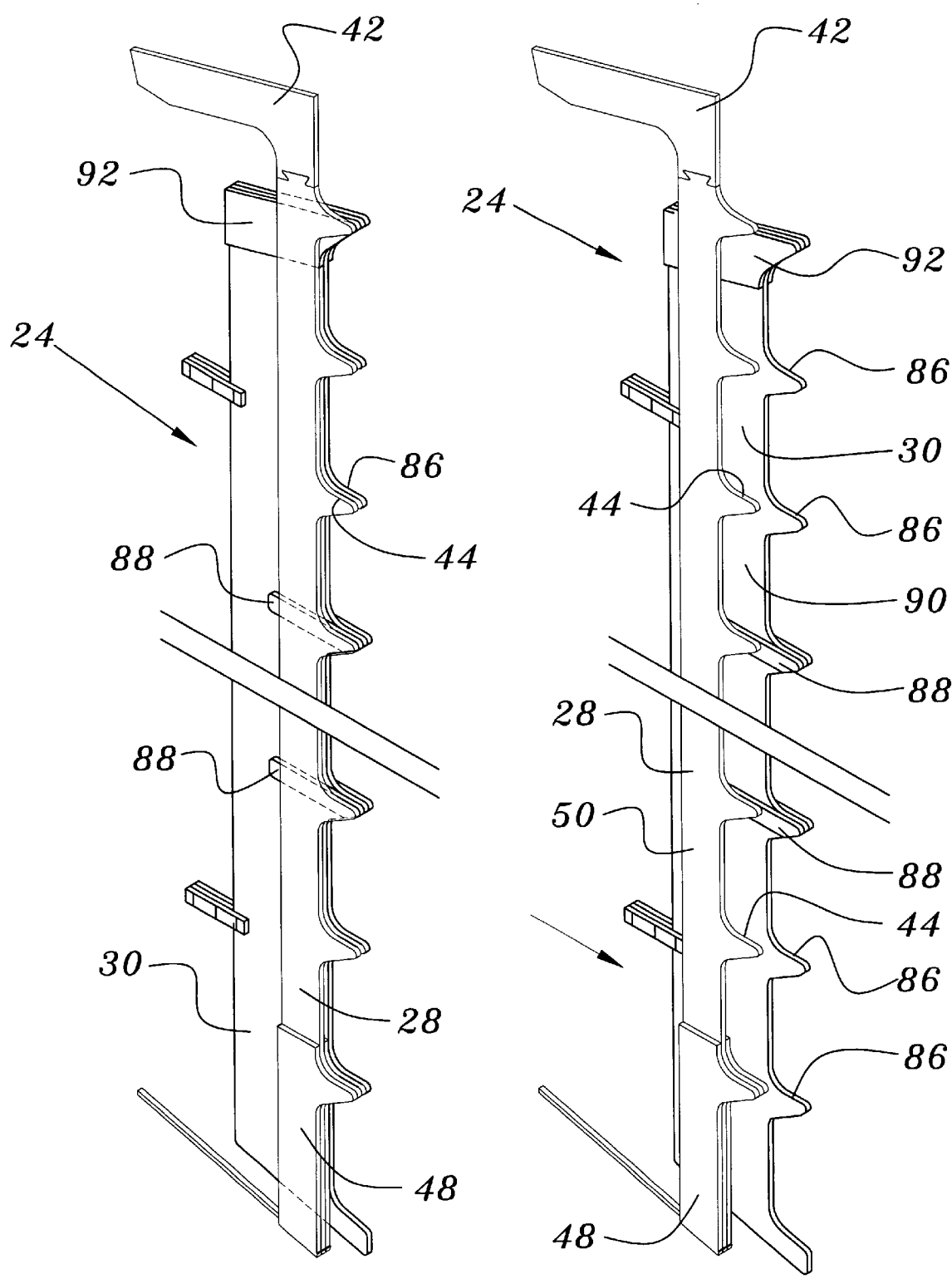
FIG. 7 is a perspective view of alternating static and dynamic bars in a home stage collecting solid matter.
FIG. 8 is a perspective view of alternating static and dynamic bars with the dynamic bars moved outward to move solid matter.
Figures 9, 10:
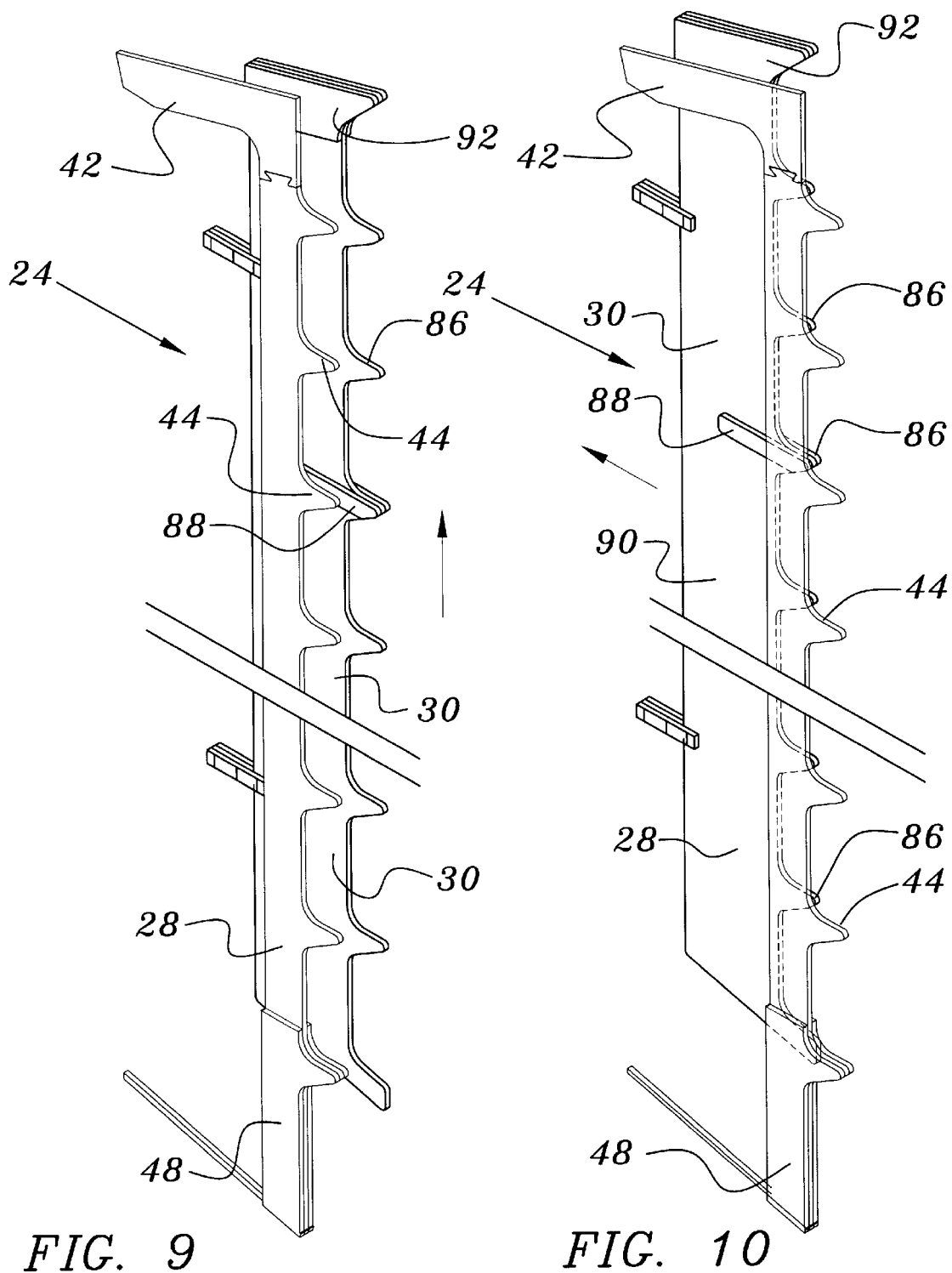
FIG. 9 is a perspective view of alternating static and dynamic bars with the dynamic bars moved upward to lift solid matter.
FIG. 10 is a perspective view of alternating static and dynamic bars with the dynamic bars moving backwards and transferring solid matter to the static bar and discharging out the top.
Figures 11, 12:
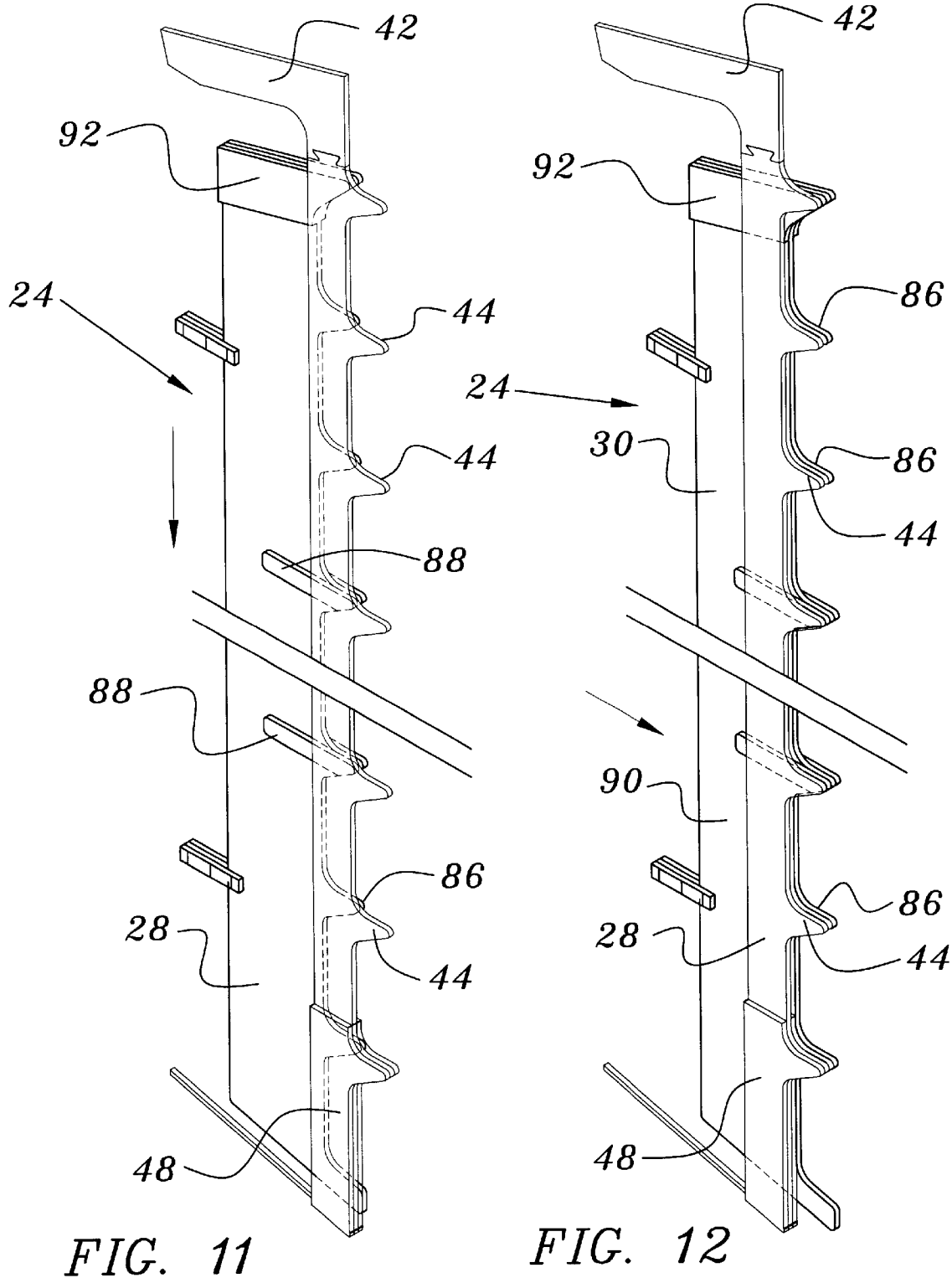
FIG. 11 is a perspective view of alternating static and dynamic bats with the dynamic bars moving towards the home stage.
FIG. 12 is a perspective view of alternating static and dynamic bars with the dynamic bars returned to the home stage.

Referring to FIGS. 7–12, operation of the grid structure 24 will be described. FIG. 7 shows the home stage when the static bars 28 and dynamic bars 30 are perfectly aligned, but spaced apart by spacers 88. In this mode, solid matter 14 in the waste water stream 16 is deposited on the grid structure 24. FIG. 8 shows the dynamic bars 30 moving outwardly in response to a downward stroke from cylinder 60. FIG. 9 shows the dynamic bars 30 moving upwardly in response to an upward stroke from cylinder 58. This stroke lifts solid matter 14 from the waste water stream 16. FIG. 10 shows the inward movement of dynamic bars 30 so that the solid matter is deposited on shelves 44 of the static bars. This movement is in response to an upward stroke by cylinder 60. FIG. 11 shows the downward movement of dynamic bars 30 in response to the downward stroke from cylinder 58. This results in a retreat to the home stage in FIG. 12 identical to FIG. 7, when cylinder 60 causes a second stroke to move dynamic bars 30 outwardly.

Figure 13:
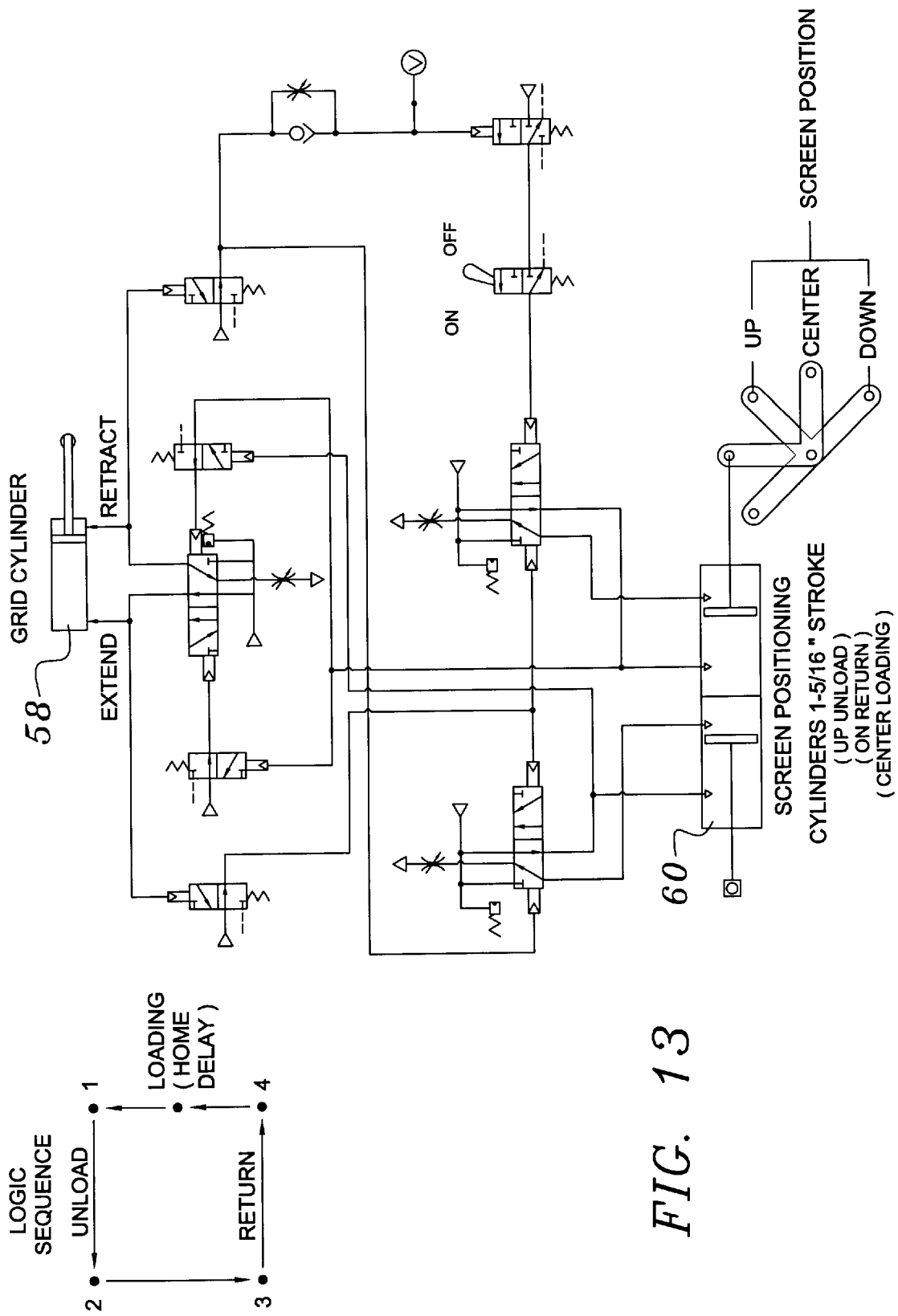
FIG. 13 is a schematic view of the pneumatic system used to activate the pneumatic cylinders.

The action of cylinders 58 and 60 is controlled by a pneumatic system shown in the schematic of FIG. 13. The air pressure required to provide the cylinder strokes is 40 to 60 psi.

The bars 28 and 30 as well as the other components of the grid structure 24 and the outer frame as well as the associated conveyer assembly 12 are made from stainless steel.

Referring back to FIG. 1, the solid matter 14 is moved upwardly along the grid structure 24 as described above until it reaches the disposal plate 38 from which it slides downwardly to standard conveyor grid 98 which is also operated by a similar pneumatic system as described above. The solid matter 14 is thereafter lifted upwardly to the waste repository 18. In this manner, solid waste 14 is removed from waste water stream 16 and the water moves through the grid structure 24 to a waste stream 20 free of solid matter. Thereafter, the waste stream 20 can be treated in accordance with standard treatment procedure.

The above description has described specific structural details embodying the invention. However, it will be within one having skill in the art to make modifications without departing from the spirit and scope of the underlying inventive concept of this stepping screen assembly. The inventive concept is not limited to the structure described, but includes such modifications and equivalents within the knowledge of one having skill in this art.

Having thus described the invention, what is claimed and desired to be secured by Letters Patent is:

1. A stepping screen assembly interposed in a liquid waste stream for collecting and disposing of solid matter in the waste stream, the assembly comprising:

(a) an upwardly inclined grid structure containing multiple parallel alternating static and dynamic bars horizontally spaced apart, the bars each having multiple vertically and equally spaced apart shelves at a right angle to the vertical axis of the bar, each dynamic bar having multiple vertically spaced apart spacers attached to a first and second side surface;

(b) an outer frame adjacent a first and second side surface of the grid structure;

(c) the outer frame enclosing a pair of pneumatic cylinders on both the first and second exterior side surface of the grid structure;

(d) a first pneumatic cylinder on each side surface of the grid structure attached to a vertical shaft, the vertical shaft attached to a top and bottom mounting plate supporting the dynamic bars and causing the dynamic bars to move up and down vertically;

(e) a second pneumatic cylinder on each side attached to a vertical rod supporting a pair of bell cranks on each side, the pair of bell cranks on each side attached to the vertical shaft causing the dynamic bars to move forward and back horizontally; and (f) the dynamic bar movement causing the solid matter in the liquid waste stream to be lifted upwardly on the shelves to a top most level from which the solid matter falls by gravity to a means for disposing of the solid matter.

2. The stepping screen assembly according to claim 1 wherein a first and second exterior side surface of the grid structure contains a static bar adjacent the outer frame.

3. The stepping screen assembly according to claim 1 wherein the pair of pneumatic cylinders on each side consists of a single stroke pneumatic cylinder and a double stroke pneumatic cylinder.

4. The stepping screen assembly according to claim 1 wherein the first pneumatic cylinder is a single stroke pneumatic cylinder.

5. The stepping screen assembly according to claim 1 wherein the second pneumatic cylinder is a double stroke pneumatic cylinder.

6. The stepping screen assembly according to claim 5 wherein a first end of each bell crank is attached to the vertical rod activated by the second pneumatic cylinder stroke and a second end is attached with a connector sleeve to the vertical shaft.

7. The stepping screen assembly according to claim 1 wherein the pair of bell cranks on each side are connected by a first and second torsion bar.

8. The stepping screen assembly according to claim 1 wherein the dynamic bars are supported in grooves on an edge of each mounting plate.

9. The stepping screen assembly according to claim 1 wherein the means for disposing of the solid matter is an upwardly directed stepping conveyor leading to a solid waste disposal container.

10. A stepping screen assembly interposed in a liquid waste stream for collecting and disposing of solid matter in the waste stream, the assembly comprising:
- (a) an upwardly inclined grid structure containing multiple parallel alternating static and dynamic bars horizontally spaced apart, the bars each having multiple shelves equally spaced apart and at a substantially 90° angle to a vertical axis of each bar;
- (b) multiple spacers vertically spaced apart attached to each side surface of each dynamic bar;
- (c) an outer frame surrounding the grid structure on at least three sides, the outer frame enclosing a pair of pneumatic cylinders on a first and second side of the grid structure;
- (d) the pneumatic cylinders driving the dynamic bars up and down and out and in with respect to the static bars; and
- (e) the dynamic bar movement causing the solid matter in the liquid waste stream to be lifted upwardly on the shelves to a top most level from which the solid matter falls by gravity to a means for disposing of the solid matter.

11. The stepping screen assembly according to claim 10 wherein the pair of pneumatic cylinders on each side of the grid structure consists of a single stroke cylinder and a double stroke cylinder.

12. The stepping screen assembly according to claim 11 wherein the single stroke cylinder is attached to a vertical shaft connected to multiple mounting plates having grooves along a longitudinal edge for receiving a back edge of a dynamic bar.

13. The stepping screen assembly according to claim 12 wherein each stroke of the single stroke cylinder moves the dynamic bars either up or down.

14. The stepping screen assembly according to claim 12 wherein the double stroke cylinder moves a vertical rod supporting a first end of a pair of bell cranks, a second end of each bell crank attached to the vertical shaft to move the dynamic bars in and out with respect to the static plates.

15. The stepping screen assembly according to claim 10 wherein a static bar is located at each side of the grid structure.

16. A process for removing solid waste from a fluid stream comprising:
- (a) mounting a bottom portion of a stepping screen assembly in a liquid waste stream containing solid matter;
- (b) providing in the stepping screen assembly a grid structure containing multiple parallel alternating static and dynamic bars horizontally spaced apart, the bars each having multiple vertically spaced apart shelves at a right angle to the vertical axis of the bar, each dynamic bar having multiple vertically spaced apart spacers attached to a first and second side surface;
- (c) providing an outer frame adjacent a first and second side surface of the grid structure;
- (d) providing first and second pneumatic cylinders on both the first and second exterior side surface of the grid structure mounted within the outer frame;
- (e) driving a vertical rod downwardly with a stroke of the first pneumatic cylinder, the vertical shaft driving multiple mounting plates supporting the dynamic bars;
- (f) driving a pair of bell cranks at a first end with a vertical rod attached to the second pneumatic cylinder ion each side of the grid structure, the bell cranks driving the vertical shaft at a second end;
- (g) lifting the solid waste material from the fluid stream with the shelves as the solid waste material impacts the grid structure; and
- (h) dropping the solid waste material by gravity from a top portion of the grid structure to a means for disposing of the solid matter.

17. The process according to claim 16 wherein the first pneumatic cylinder is a single stroke cylinder driving the dynamic rods up and down with respect to the static bars.

18. The process according to claim 16 wherein the second pneumatic cylinder is a double stroke cylinder driving the dynamic rods in and out with respect to the static bars.

19. The process according to claim 16 wherein a conveyer is provided to carry the solid matter upwardly to a disposal bin.

20. The process according to claim 16 wherein the grid screen is provided with a static bar at each side edge adjacent the outer frame.

* * * * *